United States Patent
Yang et al.

(10) Patent No.: US 10,528,368 B2
(45) Date of Patent: *Jan. 7, 2020

(54) TAP DATA TO DETERMINE USER EXPERIENCE ISSUES

(71) Applicant: International Business Machines Corporation, Armonk, NY (US)

(72) Inventors: Naijun Yang, New York City, NY (US); Ryan D. Helmoski, Windom, MN (US); James V. Clements, Perkasie, PA (US); Michael J. Casper, Gretna, NE (US)

(73) Assignee: International Business Machines Corporation, Armonk, NY (US)

( * ) Notice: Subject to any disclaimer, the term of this patent is extended or adjusted under 35 U.S.C. 154(b) by 203 days.

This patent is subject to a terminal disclaimer.

(21) Appl. No.: 15/635,253

(22) Filed: Jun. 28, 2017

(65) Prior Publication Data
US 2019/0004820 A1    Jan. 3, 2019

(51) Int. Cl.
*G06F 3/0484* (2013.01)
*G06F 9/451* (2018.01)
(Continued)

(52) U.S. Cl.
CPC .......... *G06F 9/451* (2018.02); *G06F 3/04817* (2013.01); *G06F 3/04842* (2013.01); *G06F 3/04886* (2013.01)

(58) Field of Classification Search
CPC ............. G06F 3/04817; G06F 3/04842; G06F 3/04886; G06F 3/0487; G06F 9/451
See application file for complete search history.

(56) References Cited

U.S. PATENT DOCUMENTS 6,208,342 B1 * 3/2001 Mugura ................ G06F 3/0482
345/661
9,009,544 B2    4/2015 Cook et al.
(Continued)

FOREIGN PATENT DOCUMENTS
EP    1895389 A2    3/2008

OTHER PUBLICATIONS

"Accelerated Examination Support Document," International Business Machines Corporation, dated Sep. 18, 2017, 28 pages.
(Continued)

*Primary Examiner* — Thu V Huynh
(74) *Attorney, Agent, or Firm* — Peter Edwards (57) ABSTRACT

A method, system, and computer program product for modifying an application button size includes: receiving user interaction data associated with an application button, the user interaction data including at least tap data; determining a quantity of missed taps associated with the application button by analyzing the user interaction data, where a missed tap is a tap a predetermined distance from the application button; comparing the quantity of missed taps to a quantity of overall taps to determine a tap ratio, where the quantity of overall taps is a total number of taps for the application button, and where the tap ratio is a ratio of the quantity of missed taps to the quantity of overall taps; determining whether the tap ratio is above a missed tap threshold; and, in response to determining that the tap ratio is above the missed tap threshold, increasing a size of the application button.

15 Claims, 6 Drawing Sheets

(51) Int. Cl.
*G06F 3/0481* (2013.01)
*G06F 3/0488* (2013.01)

(56) References Cited

U.S. PATENT DOCUMENTS

| | | |
|---|---|---|
| 2002/0130847 A1 | 9/2002 | Conzola et al. |
| 2011/0161878 A1* | 6/2011 | Stallings ............... G06F 3/0482 |
| | | 715/811 |
| 2011/0242032 A1 | 10/2011 | Seo et al. |
| 2012/0179995 A1* | 7/2012 | Cok ................... H04N 1/00196 |
| | | 715/810 |
| 2014/0111487 A1 | 4/2014 | Wang |
| 2014/0123060 A1 | 5/2014 | Kuscher |
| 2014/0228077 A1 | 8/2014 | Xu |
| 2014/0372947 A1 | 12/2014 | Hill |
| 2015/0205480 A1 | 7/2015 | Loganathan |
| 2016/0162162 A1* | 6/2016 | Liu ......................... G06F 17/24 |
| | | 715/802 |
| 2017/0185287 A1 | 6/2017 | Unruh et al. |
| 2017/0235426 A1 | 8/2017 | Peterson et al. |

OTHER PUBLICATIONS

Yang et al., "Tap Data to Determine User Experience Issues," U.S. Appl. No. 15/710,927, filed Sep. 21, 2017.
List of IBM Patents or Patent Applications Treated as Related, Dated Sep. 19, 2017, 2 pages.
Yang et al., "Tap Data to Determine User Experience Issues," U.S. Appl. No. 16/390,640, filed Apr. 22, 2019.
List of IBM Patents or Patent Applications Treated as Related, Dated Apr. 16, 2019, 2 pages.
"Accelerated Examination Support Document," International Business Machines Corporation, dated Apr. 16, 2019, 33 pages.

* cited by examiner

TAP DATA TO DETERMINE USER EXPERIENCE ISSUES

BACKGROUND

The present disclosure relates to application buttons, and more specifically to using tap data to modify application button size.

Application buttons (e.g., icons) allow for user convenience and accessibility, typically on a computer system or mobile device. On a screen of a computing device, there are typically multiple application buttons displayed on a single page in a condensed size. A user of the device may be able to select the application button using a mouse, pointer, finger, or any other selection technology.

SUMMARY

The present invention provides a computer-implemented method, system, and computer program product to modify an application button size using user interaction data. The method may include receiving user interaction data associated with an application button, the user interaction data including at least tap data. The method may also include determining a quantity of missed taps associated with the application button by analyzing the user interaction data, where a missed tap is a tap a predetermined distance from the application button. The method may also include comparing the quantity of missed taps to a quantity of overall taps to determine a tap ratio, where the quantity of overall taps is a total number of taps, including the quantity of missed taps, for the application button, and where the tap ratio is a ratio of the quantity of missed taps to the quantity of overall taps. The method may also include determining whether the tap ratio is above a missed tap threshold. The method may also include, in response to determining that the tap ratio is above the missed tap threshold, increasing a size of the application button.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to application buttons, and more specifically to using tap data to modify application button size. While the present disclosure is not necessarily limited to such applications, various aspects of the disclosure may be appreciated through a discussion of various examples using this context.

To stay competitive in the digital world and retain customer loyalty, application owners and/or developers may need to continuously satisfy users by constantly making customer experience improvements on their applications (e.g., mobile applications). Improvements to applications may include an increase in application button size to allow for easier user accessibility of the applications. Typically, devices (e.g., computer system, mobile device, etc.) may display multiple application buttons at a condensed or reduced size on a screen of the device. The small sizes of the application buttons may make it difficult for a user to select the application button. Thus, increasing the button size for an application may result in an increase in user satisfaction towards the application.

The present disclosure provides a computer-implemented method, system, and computer program product to use user interaction data, including tap data, to determine a tap ratio. The tap ratio may be used to determine whether to adjust the size of the application button. Aspects of the present disclosure are directed toward using data regarding user taps, herein tap data, to select the application button to determine whether to increase a display size of the application button, either permanently or temporarily. Taps may include any method for selecting an application button on a screen of a computing device. Methods for selecting an application button may include using a mouse, pointer, finger, or any other selection technology.

When a user attempts to select the application button, the user may not always be successful. When the user is not successful in selection, particularly when the user did not tap or hit the application button, the user may have a missed tap. These missed taps and a total number of taps (herein, overall taps), including successful and missed taps, may be compared. This comparison may then be used to determine whether to increase the size of the application button.

Figure 1:
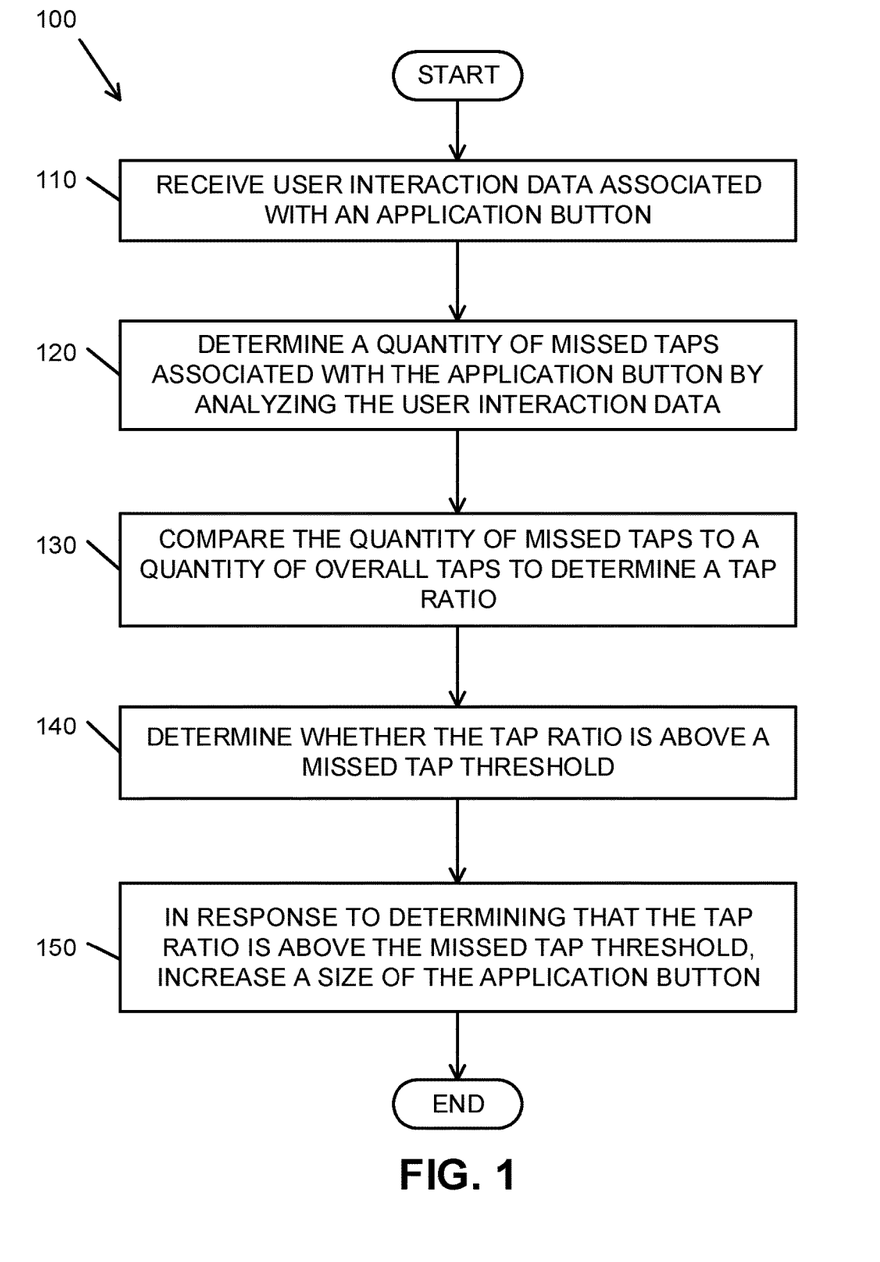
FIG. 1 depicts a flowchart of a set of operations for adjusting size of an application button, according to various embodiments.
Figure 6:
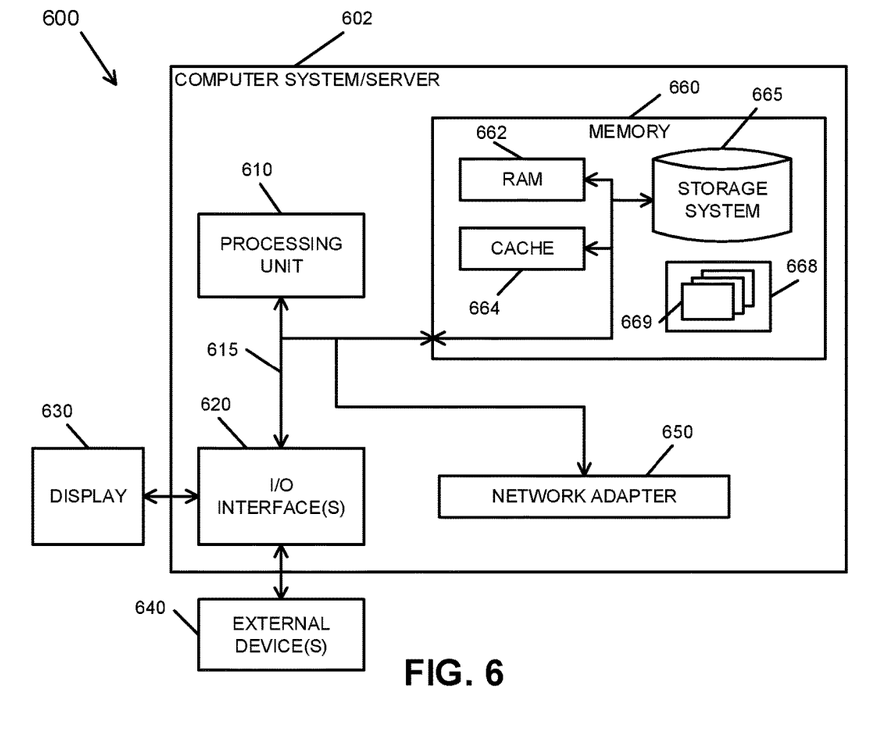
FIG. 6 depicts a block diagram of a sample computer system for implementing operations for adjusting a size of an application button, according to various embodiments.

Referring now to FIG. 1, a flowchart illustrating a method 100 for adjusting a size of an application button is depicted, according to various embodiments. In an embodiment, the method 100 is implemented as a computer script or computer program (e.g., computer executable code) to be executed by a server, such as server 220 (FIG. 2), on, or connected to, a computer system, such as computer system 200 (FIG. 2) or computer system 600 (FIG. 6). In various embodiments, the server is a computer device, such as computer system/server 602. In some embodiments, the server is a computer program or computer script.

Figure 2:
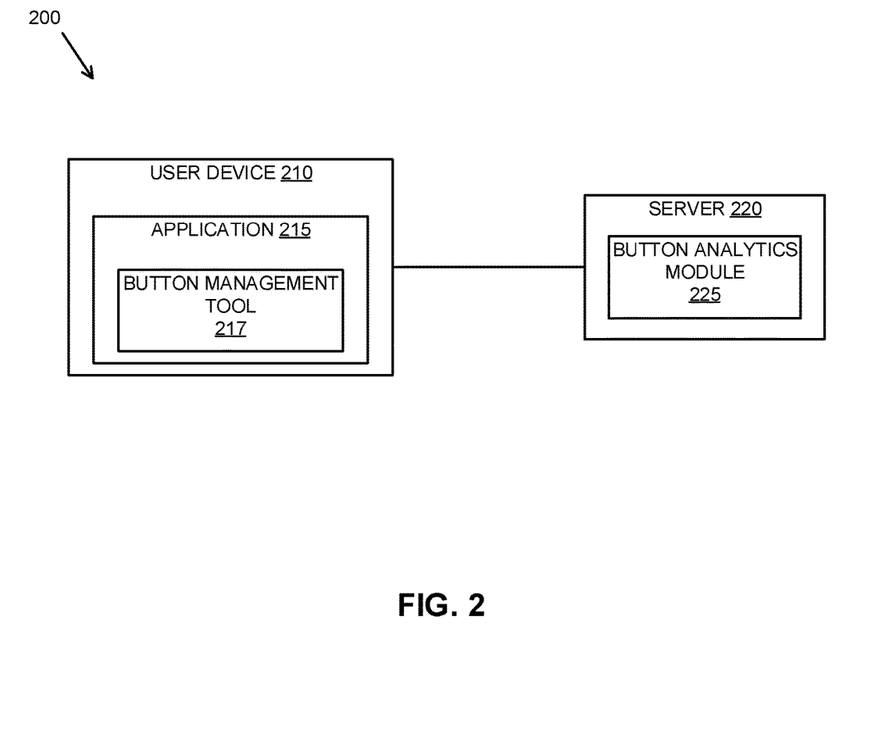
FIG. 2 depicts a block diagram of an example computer system for adjusting size of an application button, according to various embodiments.

In various embodiments, a server is configured to execute operation 110 to receive user interaction data associated with an application button. In various embodiments, the application button is an icon corresponding to an application, such as application 215 (FIG. 2). User interaction data may include at least tap data. In various embodiments, taps include one or more of: a finger tap on a touch sensitive device, a mouse click, a button click, and any other method for selecting the application button. Tap data may include any data pertaining to taps associated with an application button. In various embodiments, tap data includes all data pertaining to taps on a device, for example user device 210 (FIG. 2). Tap data may include quantity (e.g., a count) of taps, location of taps, time of taps, method of taps, etc. For example, the device may be a touch screen computer, thus a user has a multitude of methods of taps including finger tapping the touch screen and using a mouse or trackpad to tap or select the application. Tap data may include data from each of these methods.

In various embodiments, a server receives the user interaction data from an application, such as application 215 (FIG. 2). In some embodiments, the server receives the user interaction data from an application developer. The application and/or the application developer may have a button management tool, such as button management tool 217 (FIG. 2) that gathers, manages, and sends the user interaction data to the server.

In various embodiments, a server is configured to execute operation 120 to determine a quantity of missed taps associated with the application button by analyzing the user interaction data. A missed tap may be a tap at a certain distance (e.g., a predetermined distance) away from the application button or within a region separated from the application button. A region may include a surrounding area around the application button of a graphical user interface. In some embodiments, a missed tap is a tap that does not select the application button.

In various embodiments, a missed tap is determined using a buffer region outside the application button. In some embodiments, the buffer region includes any region outside of an outer boundary of the application button. The buffer region may be a region or distance surrounding the application button (e.g., surrounding area). In various embodiments, the buffer region is calculated using statistical analysis. The calculation may use a history of tap data to determine previous locations of taps, and these previous locations of taps may be used to calculate, or determine, the buffer region. In some embodiments, the buffer region is a predetermined region. The predetermined region may be selected, or set, by the button management tool. In some embodiments, the predetermined region is set by the server, or a button analytics module, such as button analytics module 225, within the server.

Once the buffer region is determined, the server may determine the quantity of missed taps by calculating a quantity or number of taps outside the buffer region, using the user interaction data. Calculating the quantity of taps outside the buffer region may include identifying each tap located outside the buffer region and computing (e.g., using summation) the total quantity or amount of identified taps.

In some embodiments, other application buttons are located near the application button (e.g., within a distance, region, surrounding area, etc.). These other application buttons may be referred to herein as nearby application buttons. In various embodiments, determining the quantity of missed taps associated with the application further includes identifying nearby application buttons, determining a nearby buffer region for each nearby application button, and calculating a quantity of taps between the buffer region and the nearby buffer regions, as well as a quantity of taps detected within a second region of the application button.

The nearby buffer regions may be determined using the same methods used to determine the buffer region surrounding the application button, as discussed herein. In various embodiments, the distance or region used to identify nearby application buttons is referred to as a first region. The second region may be a distance or region surrounding the application button, usually smaller than the first region. The first region and the second region, such as 570 and 560 respectively (FIG. 5), are further discussed herein.

In various embodiments, a server is configured to execute operation 130 to compare the quantity of missed taps to a quantity of overall taps to determine a tap ratio. The quantity of overall taps may be a total number of taps, including the quantity of missed taps, for the application button. The tap ratio may be a ratio of the quantity of missed taps to the quantity of overall taps. In various embodiments, the tap ratio may be a fraction, a percentage, or any other type of comparison.

In some embodiments, comparing the quantity of missed taps to the quantity of overall taps includes determining a quantity of buffer taps, determining a quantity of hit taps, and/or calculating the quantity of overall taps using the quantity of missed taps, the quantity of buffer taps, and the quantity of hit taps. A buffer tap may be a tap inside the buffer region. A hit tap may be a tap on (e.g., hits, touches, overlaps, etc.), or a tap that selects, the application button. In various embodiments, quantities of buffer taps and quantities of hit taps are determined using user interaction data. In various embodiments, the quantity of buffer taps, the quantity of hit taps, and the quantity of overall taps are tap data, and therefore user interaction data.

In some embodiments, calculating the quantity of overall taps includes identifying each tap corresponding to the application button and computing (e.g., summation) the total quantity or amount of identified taps. In some embodiments, calculating the quantity of overall taps includes a sum of the determined quantities of buffer taps, hit taps, and missed taps.

In various embodiments, a server is configured to execute operation 140 to determine whether the tap ratio is above a missed tap threshold. In some embodiments, the missed tap threshold is calculated using statistical analysis to determine an optimum threshold. The calculation may use a history of tap ratios for one or more application buttons. The calculation may further use a history of tap data for one or more application buttons. In some embodiments, the missed tap threshold is a predetermined, or preset, threshold value. The predetermined threshold value may be determined, or set, by the button management tool. Alternatively, the predetermined threshold value may be set by the server, or by a button analytics module, such as button analytics module 225, within the server.

In various embodiments, a server is configured to execute operation 150 to, in response to determining that the tap ratio is above the missed tap threshold, increase a size of the application button. In some embodiments, the increase in size of the application button is a permanent increase. In other embodiments, the increase in size is a temporary increase.

In various embodiments, when the increase in size is a temporary increase, the method 100 further includes detecting user selection of the application button and decreasing the size of the application button. User selection of the application button may include a user tapping, or clicking, the application button. In some embodiments, the application button is decreased to the original size, or size before the increase.

In various embodiments, the server determines that the tap ratio is below the missed tap threshold. In response to determining that the tap ratio is below the missed tap threshold, a server may be configured to leave the application button at the original size, or not change the size of the application. In some embodiments, in response to determining that the tap ratio is below the missed tap threshold, the server returns to operation 110.

Referring to FIG. 2, a block diagram of a sample computer system 200 for adjusting size of an application button is depicted, according to various embodiments. System 200 is one possible computer system capable of adjusting the size of the application button, and is illustrated for example purposes.

In various embodiments, system 200 includes a user device 210 and a server 220. In some embodiments, the user device 210 communicates with the server 220 via any suitable network (e.g., local area network, wide area network, etc.). The user device 210 may include one or more applications. The system 200 depicts user device 210 with one application 215. User device 210, however, is not limited to this depiction. Application 215 may include a button management tool 217. In various embodiments, the button management tool 217 is the button management tool referred to herein.

In some embodiments, the server 220 includes a button analytics module 225. In various embodiments, the button analytics module 225 executes the operations 110-150, discussed herein and depicted in FIG. 1.

Figure 3:
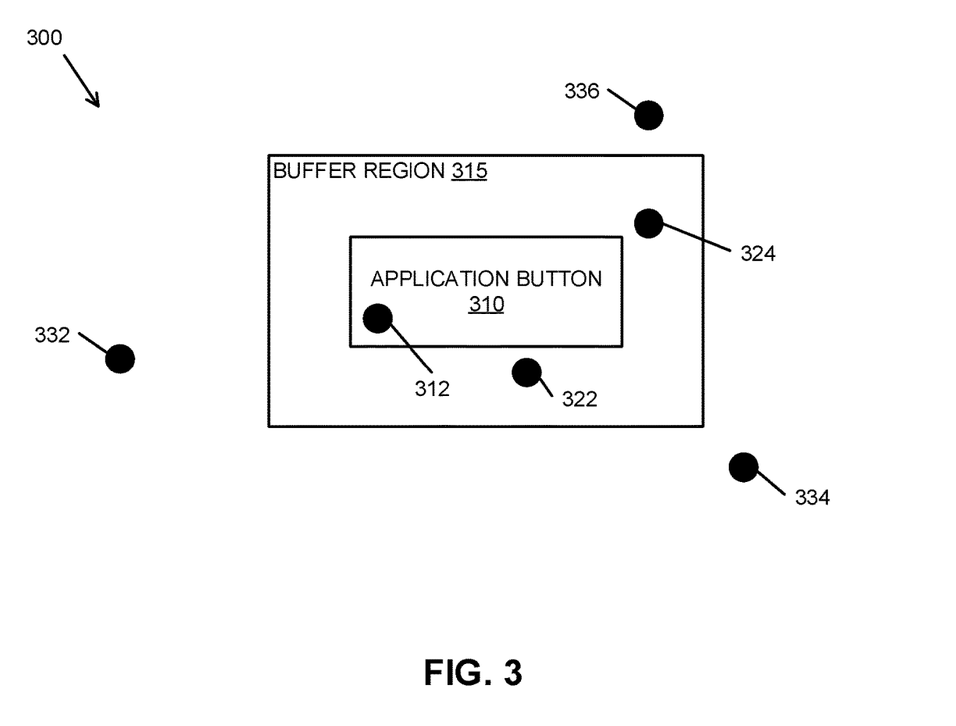
FIG. 3 depicts a schematic diagram of an example tap scenario, according to various embodiments.

Referring to FIG. 3, a schematic diagram of an example tap scenario 300 is depicted, according to various embodiments. Tap scenario 300 is one possible scenario illustrating taps of the application button, and is illustrated for example purposes.

In various embodiments, example tap scenario 300 includes an application button 310 and a buffer region 315. Tap scenario 300 may also include taps 312, 322, 324, 332, 334, and 336. In this example, tap 312 may be a hit tap, as it is located on the application button 310. Taps 322 and 324 are located inside the buffer region 315, thus taps 322 and 324 may be buffer taps. Taps 332, 334, and 336 are located outside the buffer region 315, thus taps 332, 334, and 336 may be missed taps.

In the example tap scenario 300, a server, such as server 220 (FIG. 2), and/or a button analytics module, such as button analytics module 225 (FIG. 2), may determine or calculate a total of three missed taps (taps 332, 334, and 336). The server and/or the button analytics module may also determine or calculate a total of six overall taps (taps 312, 322, 324, 332, 334, and 336).

Figure 4:
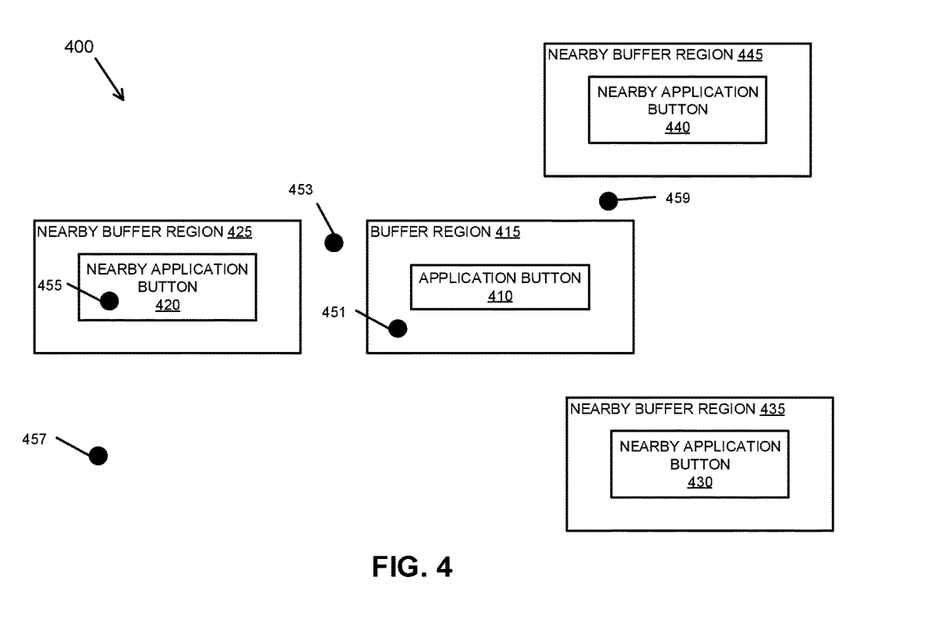
FIG. 4 depicts a schematic diagram of an example tap scenario with nearby application buttons, according to various embodiments.

Referring to FIG. 4, a schematic diagram of an example tap scenario 400 with nearby application buttons is depicted, according to various embodiments. Tap scenario 400 is one possible scenario of application buttons and taps, and is illustrated for example purposes.

In various embodiments, tap scenario 400 includes application button 410, nearby application button 420, nearby application button 430, and nearby application button 440. Application button 410 may be surrounded by buffer region 415. Nearby application buttons 420, 430, and 440 may each be surrounded by buffer regions 425, 435, and 445, respectively.

Tap scenario 400 may also include taps 451, 453, 455, 457, and 459. Tap 451 is located inside buffer region 415, thus tap 451 may be a buffer tap. Taps 453 and 459 may be located between buffer region 415 and the nearby buffer regions 425 and 445, thus taps 453 and 459 may be missed taps. In the tap scenario 400, taps 457 and 455 may not correspond to application button 410, due to distance from the application button 410 (as discussed herein), and thus may not be included in the quantity of overall taps.

In the example tap scenario 400, a server, such as server 220 (FIG. 2), and/or a button analytics module, such as button analytics module 225 (FIG. 2), may determine a total of two missed taps (taps 453 and 459). The server and/or the button analytics module may also determine a total of three overall taps (taps 451, 453, and 459).

Figure 5:
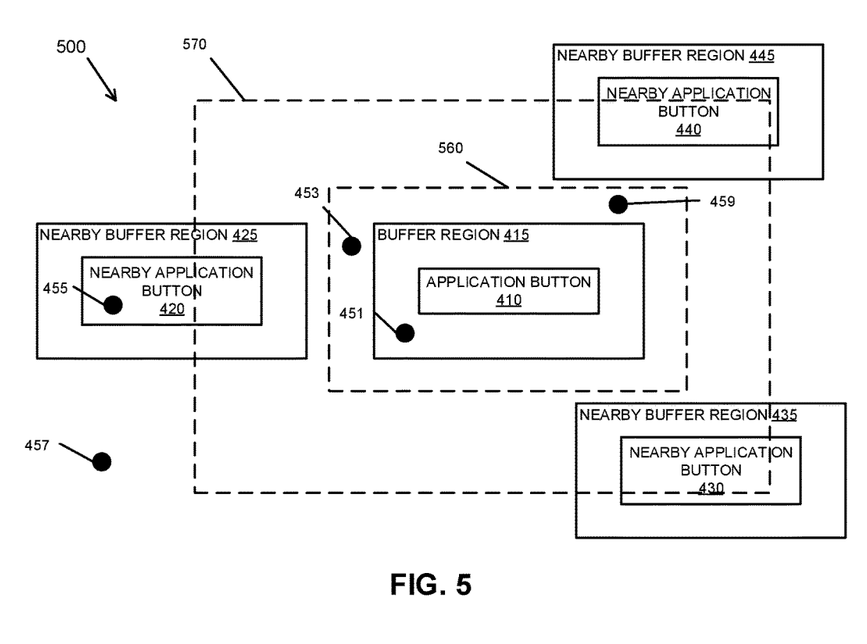
FIG. 5 depicts a schematic diagram of a first region and a second region for an example tap scenario, according to various embodiments.

Referring to FIG. 5, a schematic diagram of a first region 570 and a second region 560 for an example tap scenario 500 is depicted, according to various embodiments. Tap scenario 500 is one possible scenario of application buttons and taps, and is illustrated for example purposes.

In various embodiments, tap scenario 500 includes application button 410, buffer region 415, nearby application button 420, nearby buffer region 425, nearby application button 430, nearby buffer region 435, nearby application button 440, and nearby buffer region 445, from tap scenario 400 (FIG. 4), along with first region 570 and second region 560. In various embodiments, first region 570 is a region or distance near, or surrounding, the application button used to identify surrounding applications. Second region 560 may be a region or distance near, or surrounding, buffer region 415 used to identify missed taps corresponding to the application button 410. In various embodiments, first region 570 and second region 560 are determined by a server and/or a button analytics module, such as server 220 and button analytics module 225 (FIG. 2). In this example tap scenario 500, nearby application buttons 420, 430, and 440 are all at least intersecting first frame 570, thus indicating that nearby application buttons 420, 430, and 440 are nearby applications.

Tap scenario 500 may also include taps 451, 453, 455, 457, and 459 from tap scenario 400 (FIG. 4). Tap 451 is located inside buffer region 415, thus tap 451 may be a buffer tap. Taps 453 and 459 may be located inside second region 560, thus taps 453 and 459 may be missed taps, in this scenario. In this tap scenario 400, taps 457 and 455 are not inside second region 560, indicating that taps 457 and 455 may not correspond to application button 410, and thus may not be included in the quantity of overall taps.

In this example tap scenario 500, a server, such as server 220 (FIG. 2), and/or a button analytics module, such as button analytics module 225 (FIG. 2), may determine a total of two missed taps (taps 453 and 459). The server and/or the button analytics module may also determine a total of three overall taps (taps 451, 453, and 459) for application button 410.

Referring to FIG. 6, computer system 600 is a computer system/server 602 is shown in the form of a general-purpose computing device, according to various embodiments. The components of computer system/server 602 may include, but are not limited to, one or more processors or processing units 610, a system memory 660, and a bus 615 that couple various system components including system memory 660 to processor 610.

Bus 615 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 660 can include computer system readable media in the form of volatile memory, such as random access memory (RAM) 662 and/or cache memory 664. Computer system/server 602 may further include other removable/non-removable, volatile/non-volatile computer system storage media. By way of example only, storage system 665 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 615 by one or more data media interfaces. As will be further depicted and described below, memory 660 may include at least one program product having a set (e.g., at least one) of program modules that are configured to carry out the functions of embodiments of the invention.

Program/utility 668, having a set (at least one) of program modules 669, may be stored in memory 660 by way of example, and not limitation, as well as an operating system, one or more application programs, other program modules, and program data. Each of the operating system, one or more application programs, other program modules, and program data or some combination thereof, may include an implementation of a networking environment. Program modules 669 generally carry out the functions and/or methodologies of embodiments of the invention as described herein.

Computer system/server 602 may also communicate with one or more external devices 640 such as a keyboard, a pointing device, a display 630, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 620. Still yet, computer system/server 602 can communicate with one or more networks such as a local area network (LAN), a general wide area network (WAN), and/or a public network (e.g., the Internet) via network adapter 650. As depicted, network adapter 650 communicates with the other components of computer system/server 602 via bus 615. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving user interaction data associated with an application button, the user interaction data including at least tap data;
   determining a quantity of missed taps associated with the application button by analyzing the user interaction data, wherein a missed tap is a tap that is a predetermined distance from the application button, and wherein determining the quantity of missed taps comprises:
   determining a buffer region surrounding the application button,
   calculating, using the user interaction data, a quantity of taps outside the buffer region,
   identifying nearby application buttons, wherein the nearby application buttons are one or more application buttons within a first region of the application button,
   determining a nearby buffer region for each of the nearby application buttons, and
   calculating, using the user interaction data, a quantity of taps detected between the buffer region and the nearby buffer regions and a quantity of taps detected within a second region of the application button, the second region smaller than the first region;
   comparing the quantity of missed taps to a quantity of overall taps to determine a tap ratio, wherein the quantity of overall taps is a total number of taps, including the quantity of missed taps, for the application button, and wherein the tap ratio is a ratio of the quantity of missed taps to the quantity of overall taps;
   determining whether the tap ratio is above a missed tap threshold; and
   in response to determining that the tap ratio is above the missed tap threshold, increasing a size of the application button.

2. The method of claim 1, wherein the buffer region is calculated using statistical analysis.

3. The method of claim 1, wherein the buffer region is a predetermined region.

4. The method of claim 1, wherein comparing the quantity of missed taps to the quantity of overall taps comprises:
   determining, using the user interaction data, a quantity of buffer taps, wherein a buffer tap is a tap inside the buffer region;
   determining, using the user interaction data, a quantity of hit taps, wherein a hit tap is a tap on the application button; and
   calculating the quantity of overall taps using the quantity of missed taps, the quantity of buffer taps, and the quantity of hit taps.

5. The method of claim 4, wherein the tap data includes the quantity of buffer taps, the quantity of hit taps, and the quantity of overall taps.

6. The method of claim 1, wherein the missed tap threshold is calculated using statistical analysis to determine an optimum threshold, the calculation based on a history of tap ratios for one or more application buttons.

7. The method of claim 1, wherein the missed tap threshold is a predetermined threshold value.

8. The method of claim 1, further comprising:
   in response to increasing the size of the application button, detecting user selection of the application button; and
   in response to detecting the user selection of the application button, decreasing the size of the application button.

9. The method of claim 1, wherein taps include at least one of a finger tap on a touch sensitive device, a mouse click, and a button press.

10. The method of claim 1, wherein the application button is an application icon.

11. A system having one or more computer processors, the system configured to:
- receive user interaction data associated with an application button, the user interaction data including at least tap data;
- determining a quantity of missed taps associated with the application button by analyzing the user interaction data, wherein a missed tap is a tap that is a predetermined distance from the application button, and wherein determining the quantity of missed taps comprises:
  - determining a buffer region surrounding the application button,
  - calculating, using the user interaction data, a quantity of taps outside the buffer region,
  - identifying nearby application buttons, wherein the nearby application buttons are one or more application buttons within a first region of the application button,
  - determining a nearby buffer region for each of the nearby application buttons, and
  - calculating, using the user interaction data, a quantity of taps detected between the buffer region and the nearby buffer regions and a quantity of taps detected within a second region of the application button, the second region smaller than the first region;
- compare the quantity of missed taps to a quantity of overall taps to determine a tap ratio, wherein the quantity of overall taps is a total number of taps, including the quantity of missed taps, for the application button, and wherein the tap ratio is a ratio of the quantity of missed taps to the quantity of overall taps;
- determine whether the tap ratio is above a missed tap threshold; and
- in response to determining that the tap ratio is above the missed tap threshold, increase a size of the application button.

12. The system of claim 11, wherein comparing the quantity of missed taps to the quantity of overall taps comprises:
- determining, using the user interaction data, a quantity of buffer taps, wherein a buffer tap is a tap inside the buffer region;
- determining, using the user interaction data, a quantity of hit taps, wherein a hit tap is a tap on the application button; and
- calculating the quantity of overall taps using the quantity of missed taps, the quantity of buffer taps, and the quantity of hit taps.

13. The system of claim 12, wherein the tap data includes the quantity of buffer taps, the quantity of hit taps, and the quantity of overall taps.

14. A computer program product comprising a non-transitory computer readable storage medium having program instructions embodied therewith, the program instructions executable by a processor to cause the processor to perform a method comprising:
- receiving user interaction data associated with an application button, the user interaction data including at least tap data;
- determining a quantity of missed taps associated with the application button by analyzing the user interaction data, wherein a missed tap is a tap that is a predetermined distance from the application button;
- comparing the quantity of missed taps to a quantity of overall taps to determine a tap ratio, wherein the quantity of overall taps is a total number of taps, including the quantity of missed taps, for the application button, and wherein the tap ratio is a ratio of the quantity of missed taps to the quantity of overall taps, wherein comparing the quantity of missed taps to the quantity of overall taps comprises:
  - determining, using the user interaction data, a quantity of buffer taps, wherein a buffer tap is a tap inside the buffer region,
  - determining, using the user interaction data, a quantity of hit taps, wherein a hit tap is a tap on the application button, and
  - calculating the quantity of overall taps using the quantity of missed taps, the quantity of buffer taps, and the quantity of hit taps;
- determining whether the tap ratio is above a missed tap threshold; and
- in response to determining that the tap ratio is above the missed tap threshold, increasing a size of the application button.

15. The computer program product of claim 14, wherein determining the quantity of missed taps comprises:
- determining a buffer region surrounding the application button; and
- calculating, using the user interaction data, a quantity of taps outside the buffer region.

* * * * *